United States Patent
Lyons et al.

(10) Patent No.: US 12,475,197 B2
(45) Date of Patent: Nov. 18, 2025

(54) OUT-OF-DISTRIBUTION DETECTION AND RECOGNITION OF ACTIVITIES WITH INERTIAL MEASUREMENT UNIT SENSOR

(71) Applicant: Cypress Semiconductor Corporation, San Jose, CA (US)

(72) Inventors: Niall Lyons, Deanhill (IE); Avik Santra, Munich (DE); Ashutosh Pandey, Irvine, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 632 days.

(21) Appl. No.: 17/886,362

(22) Filed: Aug. 11, 2022

(65) Prior Publication Data

US 2023/0080736 A1 Mar. 16, 2023

Related U.S. Application Data

(60) Provisional application No. 63/244,613, filed on Sep. 15, 2021.

(51) Int. Cl.
 G06F 18/24 (2023.01)
 G06F 18/214 (2023.01)
 G06F 18/2413 (2023.01)

(52) U.S. Cl.
 CPC ...... G06F 18/24147 (2023.01); G06F 18/214 (2023.01)

(58) Field of Classification Search
 CPC .. G06F 18/24147; G06F 18/214; G06V 10/56
 USPC ......................................................... 382/159
 See application file for complete search history.

(56) References Cited

U.S. PATENT DOCUMENTS 11,692,829 B2 * 7/2023 Shu ..................... G01C 21/1654
 701/472
2019/0172232 A1 * 6/2019 Penatti ................. G06T 11/206

* cited by examiner

Primary Examiner — Neil R Mclean (57) ABSTRACT

Implementations disclosed describe methods, devices, and systems to perform out-of-distribution and recognition of activities using an inertial measurement unit (IMU) sensor. A method may include receiving motion data by a device from a motion sensor. The method further includes generating image data comprising one or more images based on the motion data. The method further includes determining that a first portion of the image data corresponds to activities outside a classification distribution. The method further includes filtering the image data by removing the first portion from the image and generating filtered image data. The method further includes determining an activity classification, within the classification distribution, based on the filtered image data. The method further includes modifying an operating parameter of the device based on the activity classification.

20 Claims, 6 Drawing Sheets

OUT-OF-DISTRIBUTION DETECTION AND RECOGNITION OF ACTIVITIES WITH INERTIAL MEASUREMENT UNIT SENSOR

RELATED APPLICATIONS

This application claims the benefit of U.S. Provisional Application No. 63/244,613, filed Sep. 15, 2021, the entire contents of which are being incorporated herein by reference.

TECHNICAL FIELD

The instant disclosure pertains to detecting out-of-distribution (OoD) samples and performing human activity classification from motion data using deep learning techniques.

BACKGROUND

Human activity recognition can enable automatic control of devices such as heating, ventilation, air conditioning, and lighting, among others. Human activity classification involves detecting motion data using a device carried by an individual and determining an activity in which a user is engaged based on the motion data. Activity classifications may be used for device mode control, automation control, safety monitoring, and/or other applications.

Determining whether inputs are out-of-distribution (OoD) is often a building block for safely deploying machine learning models in the open world. The real world is open and full of unknowns, presenting significant challenges for machine learning models that must reliably handle diverse inputs. Specifically, determining whether inputs are OoD is a problem for deploying models for identifying activities based on motion data. In an open-world classification setting (e.g., limited/minimal number of constraints placed on training and live data), a system needs to handle (e.g., reject) OoD samples arising from different unknown classes, sensor degradations, sensor interferences, or the like.

DETAILED DESCRIPTION

Human activity recognition can enable automatic control of devices such as heating, ventilation and air conditioning, and/or lighting, leading to energy savings. Inertial measurement unit (IMU) sensors can be used to acquire motion data that can be leveraged to detect and classify human activities. For example, an IMU can be implemented in a wearable device. Human activity may include activities such as jumping, running, climbing stairs, etc. Deep learning solutions (e.g., one or more neural networks) may be employed to perform activity classification using the motion data. Deep learning models are optimized using conventional loss functions such as, for example, cross-entropy loss. However, conventional functions that utilize Softmax-based solutions (e.g., determining the relative probability of a multi-class classification solution) may only ensure separability of the classes in the feature space but fall short in discriminating between classes in the feature space. However, in an open-world classification setting, both separation and discrimination properties can have relevant impacts to ensure that the activity recognition system still works under variations in the input conditions (e.g., capturing data in different environments, with different person profiles, sensor noise, sensor degradation, etc.).

An activity classification system encounters instances of in-distribution samples (e.g., activity classification such as jumping, running, laying down, etc.) and out-of-distribution (OoD) samples arising from different unknown classes, sensor degradations, or sensor interferences (e.g., due in part to the breadth of input conditions of an open world environment). In some instances, a learning model may not be trained to handle diverse live data that may include underlying class features that are different from the data used to train the model. For example, a trained learning model may suffer from a distribution shift when a distribution of variables changes between the training environment and the live environment. Distribution shift may lead to system failures when the trained recognition model predicts live classifications using closed-world training assumptions. For example, the training data may be insufficient in preparing a model for a different (e.g., open environment, diverse environment, etc.). As a result, conventional learning models experience problems arising from the open-world deployment of a recognition system.

Aspects and implementation of the present disclosure address these and other shortcomings of existing technology by providing methods, devices, and/or systems in various embodiments that detect OoD samples from the training and live execution of an activity recognition network. The filtering of the OoD results allows only the in-distribution samples into an activity recognition network for training and/or live classification. The detection and removal of OoD samples may allow the activity recognition network to be trained from a focused group of samples (e.g., those possessing features of activities within a distribution classification). For example, processed samples may first be evaluated whether they are in or out of a classification distribution prior to being classified (e.g., sorted) into an appropriate activity classification. Aspects of the present disclosure include an OoD detector implemented using Neural Networks capable of rejecting unknown classes and detecting distribution shifts.

Implementations disclosed herein include methods, devices, and systems to perform out-of-distribution and recognition of activities using an inertial measurement unit (IMU) sensor. An example method may include receiving motion data by a device from a motion sensor. The method further includes generating image data comprising one or more images based on the motion data. The method further includes determining that a first portion of the image data corresponds to activities outside a classification distribution. The method further includes filtering the image data by removing the first portion from the image data and generating filtered image data. The method further includes determining an activity classification, within the classification distribution, based on the filtered image data. The method may further include modifying an operating parameter of the device based on the activity classification.

In some embodiments, deep metric learning techniques are used to project input features to a lower-dimensional embedded space on which the classification tasks are performed. Deep representation (e.g., metric learning) may facilitate the projection of input samples into embedding vectors that can be clustered based on similar classification features. The distinct class clusters acquired as a result of the training may improve classification performance in an open-set environment.

In some embodiments, an embedding model, using deep representation learning, is trained using a quadruplet loss technique, where the embedding model learns to project the input sensor's time series data into an embedding vector. Latent space data from similar activities are grouped together while dissimilar activities are far apart. In some embodiments, a quadruplet variational autoencoder (VAE) is used to provide the mean embedding vector (e.g., mean component) and also its covariance (e.g., variance component). Using a reparameterization technique, a VAE decoder learns to reconstruct the filtered (e.g., noise removed) input examples across all the four encoders. The quadruplet loss is implemented on the mean embedding vector. Once trained and during inference, the embedding vector from the learned model is fed into a tracker, which uses a constant velocity to track the embedding vector over time. In some embodiments, classification gating is applied to handle spurious predictions from one-off input data. A classifier unit, such as a linear classifier, operates on the tracked embedding vector to predict and reject unknown classes using distance thresholding techniques. The activity classification system can handle sensor artifacts (e.g., noise due to sensor degradation) and environment uncertainties important for practical activity recognition solutions.

Figure 1:
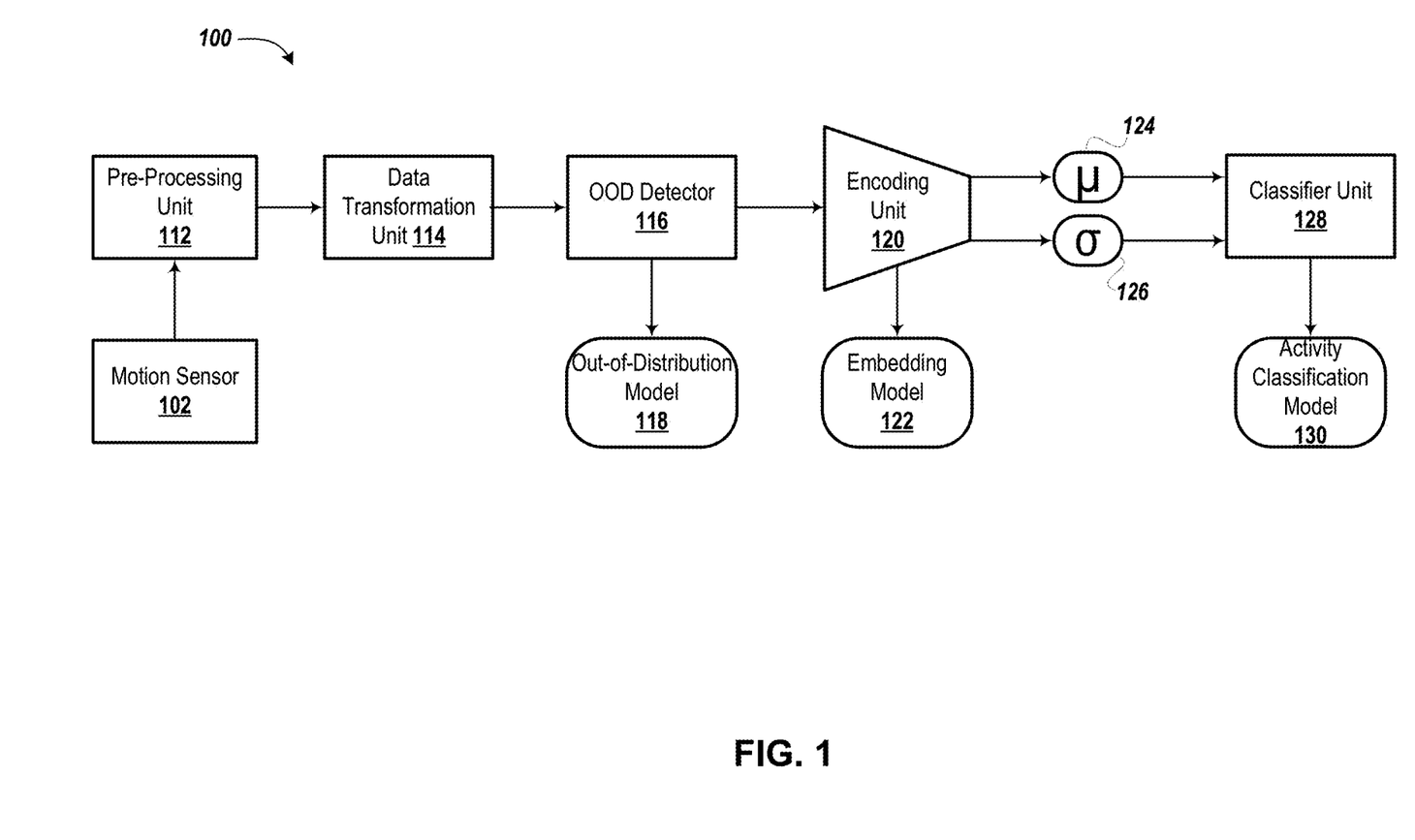
FIG. 1 is a diagram illustrating an out-of-distribution (OoD) detection and activity recognition system with a motion sensor, in accordance with some embodiments.

FIG. 1 is a diagram illustrating an out-of-distribution (OoD) detection and activity recognition system 100 with a motion sensor 102, in accordance with some embodiments. The OoD detection and activity recognition system 100 comprises a motion sensor 102 configured to generate motion data, a pre-processing unit 104 configured to filter and sample the motion data, a data transformation unit 114 configured to transform the pre-processed data into image data, an OoD detector 116 to filter OoD samples from the image data, an encoding unit configured to project the filtered image data into embedding vectors, a classifier unit 128 configured to classify the motion data based on the embedding vectors.

In some embodiments, the motion sensor 102 may include an accelerometer, a gyroscope, a magnetometer, a compass, and/or the like. The motion sensor 102 generates raw motion data streams, such as 3-axis accelerometer data and 3-axis gyroscope data. In some embodiments, the pre-processing unit 112 filters noise from the raw motion data and sample the motion data into windows of predetermined length. For example, a Butterworth noise filter may be used, and the sampling windows may have lengths of about 1-3 seconds, such as 1.5 seconds.

The data transformation unit 114 receives pre-processed motion data from the pre-processing unit 112. The pre-processed motion data may be transferred into inertial images representing the motion data. For example, as illustrated and further discussed in association with FIG. 2, the inertial images may include a distribution of pixels organized into an image. One or more of the pixels may include a set of color channels. The motion data may be represented using a color classification that includes one or more data representations for a color corresponding to a region of the image data (e.g., a pixel). For example, one or more color schemes may be used, such as a red green blue (RGB) color map. In another example, a color map may include a hue, saturation, and lightness (HSL) mapping to one or more regions of the image data (e.g., for every pixel or a collection of pixels).

In some embodiments, as previously indicated, the motion data may include 3-axis accelerometer data and 3-axis gyroscope data. The data transformation unit 114 may perform the data conversion by combining accelerometer data and gyroscope data corresponding to the same axis. For example, accelerometer x-axis data and gyroscope x-axis data may be multiplied together. In some embodiments, the motion data may include magnetometer data and may be combined (e.g., multiplied together) with one or more of the accelerometer data and/or the gyroscope data.

In some embodiments, pre-processed data (e.g., normalized accelerometer data and gyroscope data) is split into accelerometer and gyroscope arrays or matrices, $F \in \mathbb{R}^{n \times 3}$ and $\Omega \in \mathbb{R}^{n \times 3}$, respectively. The data transformation unit 114 constructs color channel values (e.g., RGB values) using the following multiplications:

$$A_1 = F_x \cdot \Omega_x^T \in \mathbb{R}^{n \times n}$$

$$A_2 = F_y \cdot \Omega_y^T \in \mathbb{R}^{n \times n}$$

$$A_3 = F_z \cdot \Omega_z^T \in \mathbb{R}^{n \times n}$$

The inertial images may include three color channels $A_1$, $A_2$, and $A_3$ using the above operations, including the transpose operation, T. In some embodiments, the color channels may use an RGB color scheme such that, for example, $A_1$ corresponds to R, $A_2$ corresponds to G, and $A_3$ corresponds to B. The inertial image is constructed by stacking each channel together, forming aggregate colors for each pixel. Each pixel is combined to construct an input image of the desired size (e.g., n=32). The input images are provided to OoD detector 116.

The OoD detector 116 employs OoD model 118 to distinguish between in-distribution and OoD classes. The OoD model 118 is configured to receive a data set $D_{in} = \{(x_i, y_i)\}_{i=1}^{N}$, denoting in-distribution data $x_i \in \mathbb{R}^k$ and categorical label $y_i \in \{y\} = \{1 \ldots C\}$ for C classes. $D_{in}$ may be generated by sampling from a distribution $p_{in}(x, y)$. The OoD model 118 may comprise a discriminative model $f_\theta(x)$ with parameters $\theta$ learned with the in-distribution data set $D_{in}$ that predicts the class posterior probability $p(y|x)$. The OoD model 118 is trained to receive data drawn from both within the distribution (sometimes referred to as "in-domain" or "pertaining to a classification") and out-of-distribution (OoD) (sometimes referred to as "of a different distribution" or "outside the classification domain") and identify the data as in-distribution or OoD.

In some embodiments, the OoD model 118 is trained using an outlier detection in neural networks (ODIN) method. ODIN includes two parts: temperature scaling and input pre-processing. The temperature scaling is applied to a scoring function of the associated neural network. For example, the ODIN scoring function may be expressed as the following:

$$S_{ODIN}(x) = \max_i \frac{\exp\left(\frac{f_i(x)}{T}\right)}{\sum_{j=1}^{C} \exp\left(\frac{f_j(x)}{T}\right)}$$

Conventional use of the ODIN technique is often focused on tuning the hyperparameter T (the temperature scaling hyperparameter) with OoD data. The equation setup reveals that with sufficient OoD data (e.g., 1000 samples), the tuning may approach a saturation where marginal scoring improvements are met. Using the ODIN technique with the Softmax classifier tends to output highly confident predictions. However, data having samples with parameter combinations near classification feature boundaries are often misclassified and can result in overall activity classification being inaccurate. This problem is further exacerbated by using input data in an open environment.

The OoD model 118 is trained using a modification to the ODIN method described previously. The OoD model 118 is trained by determining a perturbation magnitude E of in-distribution samples that reduces a classification score below a threshold limit. For example, the perturbation magnitude reduces the Softmax score for a true label. Once the perturbation reaches a threshold magnitude, the neural network is forced to generate a wrong prediction. The perturbed samples may be expressed as:

$$\hat{x} = x - \epsilon \, \text{sign}(-\nabla_x \log S_{\hat{y}}(x;T))$$

The perturbed sample in the above equation is dependent on E, the perturbation magnitude, and T, the temperature scaling hyperparameter. Constraining the training data to only include in-distribution samples, the perturbation may be simplified to the following:

$$\hat{x} = x - \epsilon \, \text{sign}(-\nabla_x S(x))$$

where the scoring function $S(x)$ is independent of the conventional temperature scaling hyperparameter. In-distribution samples may be used with the perturbation equation independent of parameters dependent on OoD samples to determine a perturbation magnitude, E, that maximizes the score $S(x)$ with only in-distribution training samples, such as expressed in the following:

$$\epsilon = \underset{i}{\text{argmax}} \sum_{x \in D_{in}^{val}} S(\hat{x})$$

In some embodiments, the perturbation magnitude is determined using a search approach with contained fixed values (e.g., 0.0025, 0.0015, 0.005, 0.01, 0.02, 0.04, 0.08, 0.10).

During inference, $S(x)$, the OoD scoring function, calculates s generated by applying live data within the classifier $f_\theta$, as described previously. The scoring function evaluates both $D_{in}^{val}$ (in-distribution samples) and $D_{out}$ (OoD samples) in the form of inertial images output from the data transformation unit 114.

The OoD detector 116 may include filtering logic that provides inertial images that are classified as being in-distribution to the encoding unit 120, while inertial images that are classified as OoD are removed from the broader data sample or otherwise filtered from the data transmitted to the encoding unit 120.

The encoding unit 120 generates a mean embedding vector 124 and a covariance embedding vector 126 from the in-distribution image data output by OoD detector 116 using an embedding model 122. The embedding model 122 may be trained using a quadruplet loss learning technique to project the inertial images representative of incoming motion data time series into embedding vectors. An embedding vector is a projection of the input data onto a vector representing the input. The embedding vector is a relatively low dimensional space into which you can translate high dimensional vectors using a learned embedding technique.

In some embodiments, during training of the embedding model 122, a set of four one-dimensional variational auto-encoders (VAEs) are coupled together to generate four different motion data time series. A first motion data time series represents an anchor class, a second motion data time series represents another input example belonging to the same class (positive class), a third motion data time series represents a sample from a first different class (negative$_1$ class), and a fourth motion data time series represents a sample from a second different class (negative$_2$ class). Each VAE outputs a mean embedding vector and a covariance embedding vector based on the received in-distribution image data. A four-coupled convolutional neural network decoder reconstructs the noise filtered motion data time series from the respective VAE.

A lightweight encoder-decoder architecture may comprise three one-dimensional convolutional layers, all including rectified linear unit (ReLu) activation with the addition of a max-pooling layer after the initial convolutional layer. The convolutional layers act as feature extractors and provide abstract representations of the input motion data in feature maps, where each layer consists of 16, 8, and 4 filters, respectively. A complementary one-dimensional decoder corresponding to the encoder is used for reconstructing the respective denoised time-series motion data.

A quadruplet loss may be defined by:

$$L_{quad} = \sum_{i,j,k}^{N} \left[ g(\underline{u}_i, \underline{u}_j)^2 - g(\underline{u}_i, \underline{u}_k)^2 + \alpha_1 \right]_+ + \sum_{i,j,k,l}^{N} \left[ g(\underline{u}_i, \underline{u}_j)^2 - g(\underline{u}_l, \underline{u}_k)^2 + \alpha_2 \right]_+$$

where $\alpha_1$ and $\alpha_2$ are the margins in two terms, g is the learned distance function by the classifier unit 128, $\underline{u}$ represents the six-channel input vector, $g(\underline{u}_i, \underline{u}_j)^2$ represents the distance between the anchor and positive (AP) mean embeddings, $g(\underline{u}_i, \underline{u}_k)^2$ represents the distance between the anchor and negative$_1$ (AN) mean embeddings, $g(\underline{u}_l, \underline{u}_k)^2$ represents the distance between the negative$_1$ and negative$_2$ (NN) mean embeddings, and the subscripted "+" indicates a max(0,x) function.

In some embodiments, during training of the embedding model 122, hard samples are generated using a random strategy to generate a study batch including anchor, positive, negative$_1$, and negative$_2$ motion data time series. The motion data time series are sent to a learned metric network to generate the distances, AP, AN, and NN, which are sent to a quadruplet loss layer with total quadruplet loss defined by:

$$L_{tot} = L_{quad} + L_{KL} + L_{MSE}.$$

where $L_{KL}$ is the KL divergence loss at the latent vector to minimize its deviation from Gaussianity with 0 mean and unit variance, and $L_{MSE}$ is the mean squared error of reconstructing the noise filtered, time-series data at each of the decoders. The embedding model 122 is trained to minimize the loss function while projecting the motion data time series into an embedding vector.

After training, the encoding unit 120 uses the embedding model 122 to process incoming in distribution inertial images to generate the mean embedding vector 124 and the covariance embedding vector 126 for classification.

The classifier unit 128 receives the mean embedding vector 124 and the covariance embedding vector 126 for classification and uses an activity classification model 130 to classify the activity. In some embodiments, the classifier unit 128 is a linear classifier, such as a k-Nearest Neighbor (k-NN) classifier (e.g., k-Nearest Neighbor classification logic). The classifier unit 128 recognizes a known activity defined by the activity classification model 130, while rejecting unknown activities using a thresholding technique to reduce false alarms. In some embodiments, the in-distribution classifications may include jumping, standing, sitting, running, ascending stairs, descending stairs, among other activities.

Figure 2:
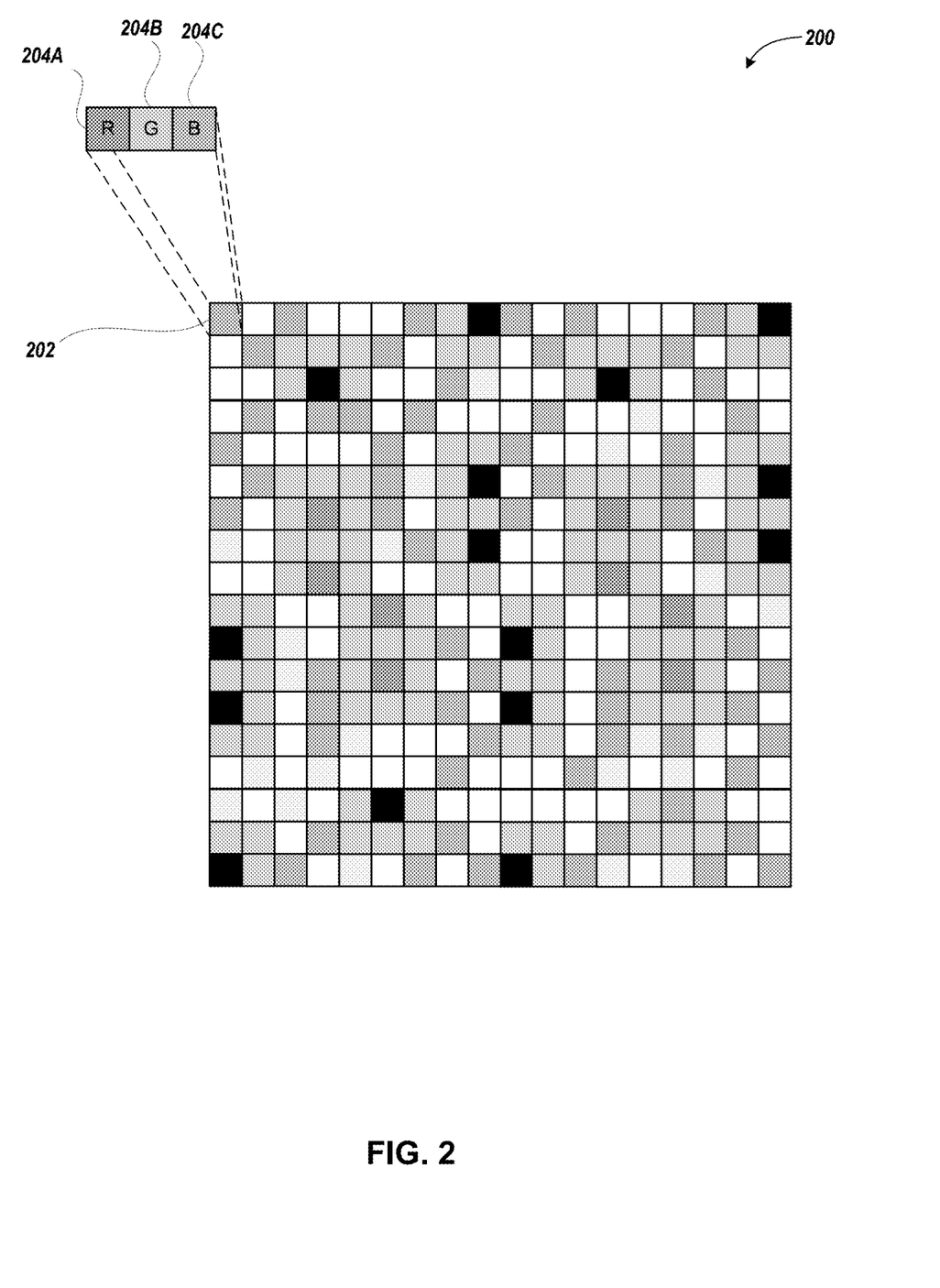
FIG. 2 illustrates an inertial image with pixels constructed using various color channels, according to some embodiments.

FIG. 2 illustrates an inertial image 200 with pixels 202 constructed using various color channels 204A-C, according to some embodiments. As described previously, a processing device such as, for example, a processing device of data transformation unit 114 receives motion data (e.g., from a motion sensor, a pre-processing unit, etc.) and transforms time-series motion data into inertial images such as inertial image 200. Details of the motion data are encoded within individual color channels representative of various dimensions of the motion data (e.g., dimensions of space such as corresponding to a defined x-axis, y-axis, and z-axis). An example flow of the motion data transformation is provided in the coming paragraphs. The example motion data transformation uses three dimensions of space as defined in Cartesian representations, and encodes the motion data into pixels using three distinct color channels corresponding to the RGB color scheme.

The data transformation may be performed by processing logic that may comprise hardware (e.g., circuitry, dedicated logic, etc.), software (such as is run on a general-purpose computer system or a dedicated machine), or any combination thereof. In one implementation, the data transformation is performed using data transformation unit 214 of FIG. 1, while in some other implementations, one or more portions of the data transformation process of FIG. 5 may be performed by one or more other machines not depicted in the figures.

Processing logic receives motion data that may include 3-axis accelerometer data, F, and 3-axis gyroscope data, $\Omega$. The processing logic samples the motion data into windows of a predetermined length (e.g., having n data samples). For example, a Butterworth noise filter may be used, and the sampling windows may have lengths of about 1-3 seconds, such as 1.5 seconds. The accelerometer data may be expressed by the following representation.

$$F = \begin{bmatrix} \begin{bmatrix} f_{1,x} & f_{1,y} & f_{1,z} \\ \vdots & \vdots & \vdots \\ f_{n,x} & f_{n,y} & f_{n,z} \end{bmatrix} \end{bmatrix} = [F_x, F_y, F_z]$$

The gyroscope data may be expressed by the following representation.

$$\Omega = \begin{bmatrix} \begin{bmatrix} w_{1,x} & w_{1,y} & w_{1,z} \\ \vdots & \vdots & \vdots \\ w_{n,x} & w_{n,y} & w_{n,z} \end{bmatrix} \end{bmatrix} = [\Omega_x, \Omega_y, \Omega_z]$$

In both representations, (x, y, x) illustrates the three dimensions of data, and n represents a temporal identifier for the data sample (e.g., a time-step within a broader temporal window). The accelerometer data is combined with the gyroscope data using the following equation where R, G, and B are color channels of an RGB color system.

$$R = F_x \cdot \Omega_x^T \in \mathbb{R}^{n \times n}$$

$$G = F_y \cdot \Omega_y^T \in \mathbb{R}^{n \times n}$$

$$B = F_z \cdot \Omega_z^T \in \mathbb{R}^{n \times n}$$

The resulting products form color channels of a pixel that form an inertial image when aggregated. The inertial image may be generalized as an array of RBG elements and can be expressed as.

$$I = [R, G, B] \in \mathbb{R}^{n \times n \times 3}$$

In some embodiments, a coordinate system different from the Cartesian representation may be used, such as a spherical coordinate system, a cylindrical coordinate system, homogeneous coordinate systems, parametric, logarithmic, and/or other systems for representing the motion data along with dimensional components of the motion data. In some embodiments, the motion data may be defined by more or less than three-dimensional components (e.g., incorporating three dimensions of space with another variable, such as, for example, a temporal component within a measurement window).

In some embodiments, the pixels 202 may be constructed using multiple color channels 204A-C (e.g., raster bands, feature maps) such as, for example, using the RGB color system where a first color channel 204A corresponds to a red component of a pixel 202, a second color channel 204B corresponds to a green component of the pixel 202, and a third color channel 204C corresponds to a blue component of the pixel 202. However, in some embodiments, a different color system may be used with a different number of color channels. For example, a YUV color system may be used. In the YUV color system, the Y channel correlates with a luminous component (Y) (e.g., physical linear-space brightness), a blue projection component (U), and a red projection component (V). In another example, a cyan, magenta, yellow, and key (black) (CMYK) color system may be used.

Figure 3:
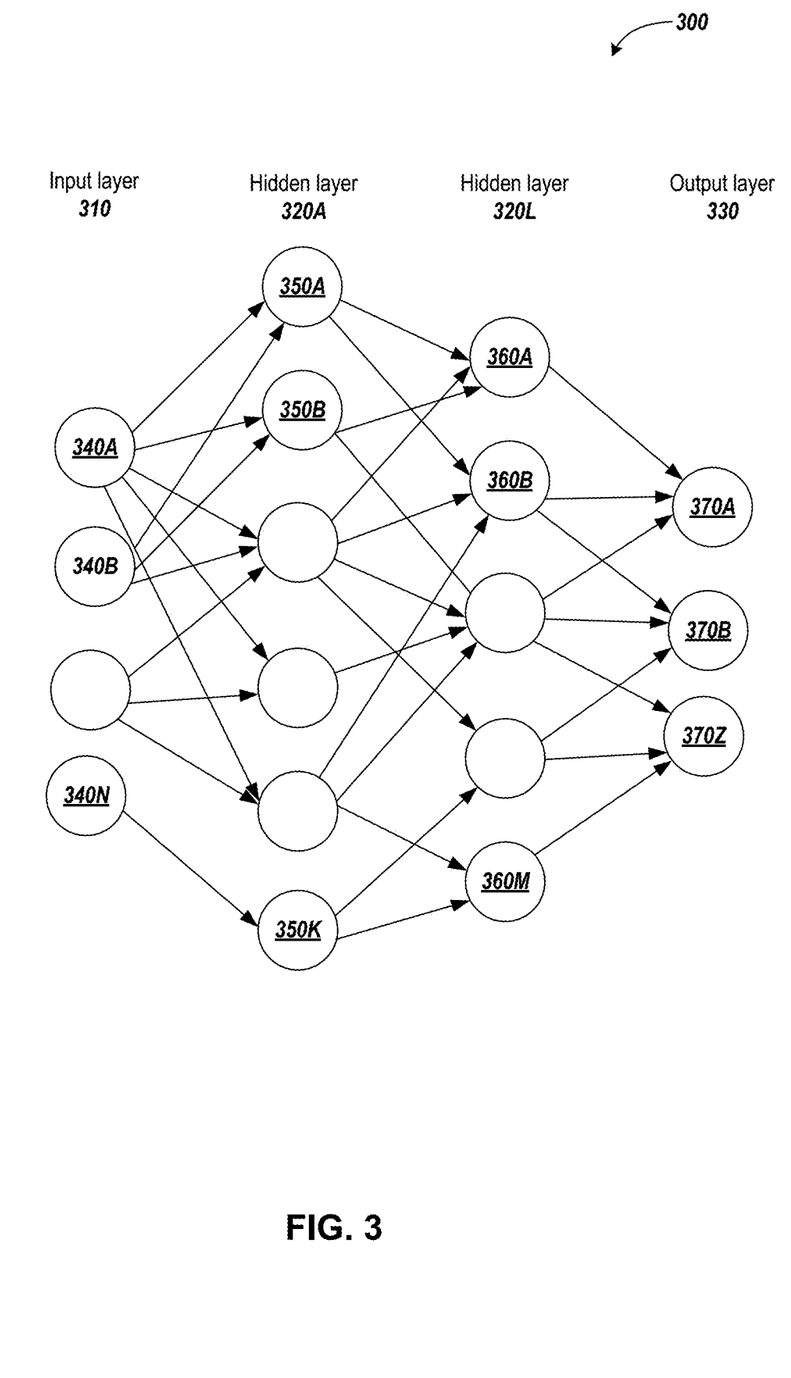
FIG. 3 schematically illustrates a structure of an example neural network, according to some embodiments.

FIG. 3 schematically illustrates a structure of an example neural network 300, according to some embodiments. As schematically illustrated by FIG. 3, one or more models (e.g., OoD model 118, embedding model 122, and/or activity classification model 130) may employ a neural network represented by a multi-layer perceptron (MLP), the artificial neurons of which are grouped into several layers, including the input layer 310, one or more hidden layers 320A-320L, and the output layer 330. The input layer 310 includes one or more neurons 340A-340N, which are connected to one or more neurons 350A-350K of the first hidden layer 320A. The first hidden layer neurons 350A-350K are, in turn, connected to one or more neurons 360A-360M of the second hidden layer 320L. The second hidden layer neurons 360A-360M are, in turn, connected to one or more neurons 370A-370Z of the output layer 330. At least some of the nodes of the neural network 300 may utilize nonlinear activation functions, while the remaining nodes (e.g., the nodes of the output layer) may utilize linear activation functions. While FIG. 3 schematically illustrates a single hidden layer 350, the number of hidden layers may vary in various implementations of the systems and methods of the present disclosure. In some embodiments, the number of hidden layers is a hyperparameter of the model, i.e., a parameter, the value of which is specified before the training process. Other hyperparameters of the model may include the numbers of nodes in each layer, the activation function types, etc.

Each edge in FIG. 3 denotes a connection for transmitting a signal from one artificial neuron to another in a manner similar to the operation of the synapses in the human brain. Edge weights, which increase or attenuate the signals transmitted through respective connections, are defined at the network training stage based on a training dataset that includes a plurality of labeled inputs (i.e., inputs with known classification).

The neural network training procedure may start with initializing all edge weights and neuron bias values to random or predetermined values. The forward propagation involves sequentially processing, by the neural network, the labeled data items of the training dataset (i.e., a plurality of motion data samples and labels classifying the data into activities within a classification distribution). The observed output of the neural network is compared with the desired output specified by the label associated with the vector being processed. The error is propagated back to the previous layers of the neural network, in which the weights and bias values are adjusted to minimize the predetermined loss function (e.g., the difference between the observed output and the desired output specified by the label, the quadruplet loss technique as described previously). This process may be repeated until the output error falls below a predetermined threshold. In some embodiments, the process may be repeated until a score of an associated scoring function (e.g., a loss function such as quadruplet loss function) meets a threshold condition (e.g., above a threshold score or below a threshold score).

In some embodiments, during training of the neural network, a set of four one-dimensional variational autoencoders (VAEs) are coupled together to generate four different motion data time series. A first motion data time series represents an anchor class, a second motion data time series represents another input example belonging to the same class (positive class), a third motion data time series represents a sample from a first different class (negative$_1$ class), and a fourth motion data time series represents a sample from a second different class (negative$_2$ class). Each VAE outputs a mean embedding vector and a covariance embedding vector based on the received in-distribution image data. A four-coupled convolutional neural network decoder reconstructs the noise filtered motion data time series from the respective VAE.

A lightweight encoder-decoder architecture may comprise three one-dimensional convolutional layers, all including rectified linear unit (ReLu) activation with the addition of a max-pooling layer after the initial convolutional layer. The convolutional layers act as feature extractors and provide abstract representations of the input motion data in feature maps, where each layer consists of 16, 8, and 4 filters, respectively. A complementary one-dimensional decoder corresponding to the encoder is used for reconstructing the respective denoised time-series motion data.

A quadruplet loss may be defined by:

$$L_{quad} = \sum_{i,j,k}^{N}\left[g(\underline{u}_i,\underline{u}_j)^2 - g(\underline{u}_i,\underline{u}_k)^2 + \alpha_1\right]_+ + \sum_{i,j,k,l}^{N}\left[g(\underline{u}_i,\underline{u}_j)^2 - g(\underline{u}_j,\underline{u}_k)^2 + \alpha_2\right]_+$$

where $\alpha_1$ and $\alpha_2$ are the margins in two terms, g is the learned distance function by the classifier unit 128, u represents the six-channel input vector, $g(\underline{u}_i,\underline{u}_j)^2$ represents the distance between the anchor and positive (AP) mean embeddings, $g(\underline{u}_i,\underline{u}_k)^2$ represents the distance between the anchor and negative$_1$ (AN) mean embeddings, $g(\underline{u}_j,\underline{u}_k)^2$ represents the distance between the negative$_1$ and negative$_2$ (NN) mean embeddings, and the subscripted "+" indicates a max(0,x) function.

As noted above with reference to FIG. 1, a machine learning-based model implementing the systems and methods of the present disclosure may process incoming motion data (e.g., accelerometer data and gyroscope data in the form of inertial images) by first detecting whether individual samples of the motion data correspond to in-distribution activities or OoD activities, encoding the in-distribution data sample in order to reduce the dimensionality of the image data, and then performing classification on the reduced dimensionality embedding vectors. In some implementations, the OOD detection, feature extraction (e.g., encoding functionality), and classification may be performed by the same neural network, in which one or more layers perform the OOD, one or more layers perform the encoding, while the remaining layers perform the classification task. In other implementations, two or more separately trained neural networks may be employed to perform OoD detection, feature extraction, and/or classification tasks.

As noted above, the systems and methods of the present disclosure leverage OoD detection to filter data before dimensionality reduction encoding and classification are performed. However, in some embodiments, encoding of both the in-distribution data and the OoD samples may occur before detection of the OoD samples.

While various common techniques may not be well suited for processing the motion data, the systems and methods of the present disclosure may advantageously employ recurrent neural networks (RNN) for sequentially processing batches of motion data in real-time.

An RNN is capable of maintaining its state, which reflects the information about the inputs previously processed by the network. The RNN would take the state information into account for processing each subsequent input. In other words, the network output is defined not only by the current input, but also by the inputs that have been previously processed by the network.

Some RNNs may be susceptible to the gradient attenuation effect, which renders a network practically incapable of processing long input sequences. The gradient attenuation effect may be avoided by utilizing long short-term memory (LSTM) layers, which utilize a gating mechanism allowing the network to choose between the own state and the input for performing the next layer of processing. Since the LSTM neural networks exhibit very low gradient attenuation, such networks can process longer input sequences.

Thus, an RNN-based model may sequentially process multiple batches of motion data and, after processing each batch, may increase the accuracy of OoD detection and/or activity classification of the received motion data.

The neural networks utilized by the systems and methods of the present disclosure may be deployed (e.g., executed by) on hardware having limited computational capacity and/or available memory (such as mobile or wearable devices). The motion data reflecting thousands of measurement points may be processed sequentially. Each batch of raw data may be discarded after being processed by the neural network since the internal state of the neural network stores the necessary information extracted from the input data processed by the network.

In some implementations, the motion data may be processed by a sequence of two or more models (e.g., OoD model 118, embedding model 122, and/or activity classification model 130), in which every model has been trained to perform an independent portion of the larger process. For example, the OoD model 118 may be trained using a modified ODIN technique to determine a perturbation magnitude threshold. In another example, the encoding model 122 may be trained using an autoencoder that includes a reduced dimensionality portion and an increased dimensionality portion capable of evaluating the accuracy of the reduced dimensionality portion of the autoencoder. The activity classification model may be trained using target output (e.g., labels) based on corresponding inputs.

In embodiments, systems and methods of the present disclosure may include artificial neural networks that include a feature representation component with a classifier or regression layers that map features to a target output space. A convolutional neural network (CNN), for example, hosts multiple layers of convolutional filters. Pooling is performed, and non-linearities may be addressed at lower layers. A multi-layer perceptron is commonly appended, mapping top layer features extracted by the convolutional layers to decisions (e.g., classification outputs). The neural network may be a deep network with multiple hidden layers or a shallow network with zero or a few (e.g., 1-2) hidden layers. Deep learning is a class of machine learning algorithms that use a cascade of multiple layers of nonlinear processing units for feature extraction and transformation. Each successive layer uses the output from the previous layer as input. Neural networks may learn in a supervised (e.g., classification) and/or unsupervised (e.g., pattern analysis) manner. Some neural networks (e.g., deep neural networks) may include a hierarchy of layers, where the different layers learn different levels of representations that correspond to different levels of abstraction. In deep learning, each level learns to transform its input data into a slightly more abstract and composite representation.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with different inputs than those present in the training dataset.

The trained neural network(s) may be periodically or continuously retrained to achieve continuous learning and improvement of the trained machine learning model. The model may generate an output based on an input, an action may be performed based on the output, and a result of the action may be measured. In some instances, the result of the action is measured within seconds or minutes. In some instances, it takes longer to measure the result of the action. For example, one or more additional processes may be performed before a result of the action can be measured. The action and the result of the action may indicate whether the output was a correct output and/or a difference between what the output should have been and what the output was. Accordingly, the action and the result of the action may be used to determine a target output that can be used as a label for the motion sensor measurements. Once the result of the action is determined, the input (e.g., motion data), the output of the trained machine learning model (e.g., activity classification), and the target result (e.g., target activity classification) may be used to generate a new training data item. The new training data item may then be used to further train the trained machine learning model. This retraining process may be performed on a remote device (e.g., an edge computing device, a remote device such as, for example, a mobile device or a wearable, etc.)

Figure 4:
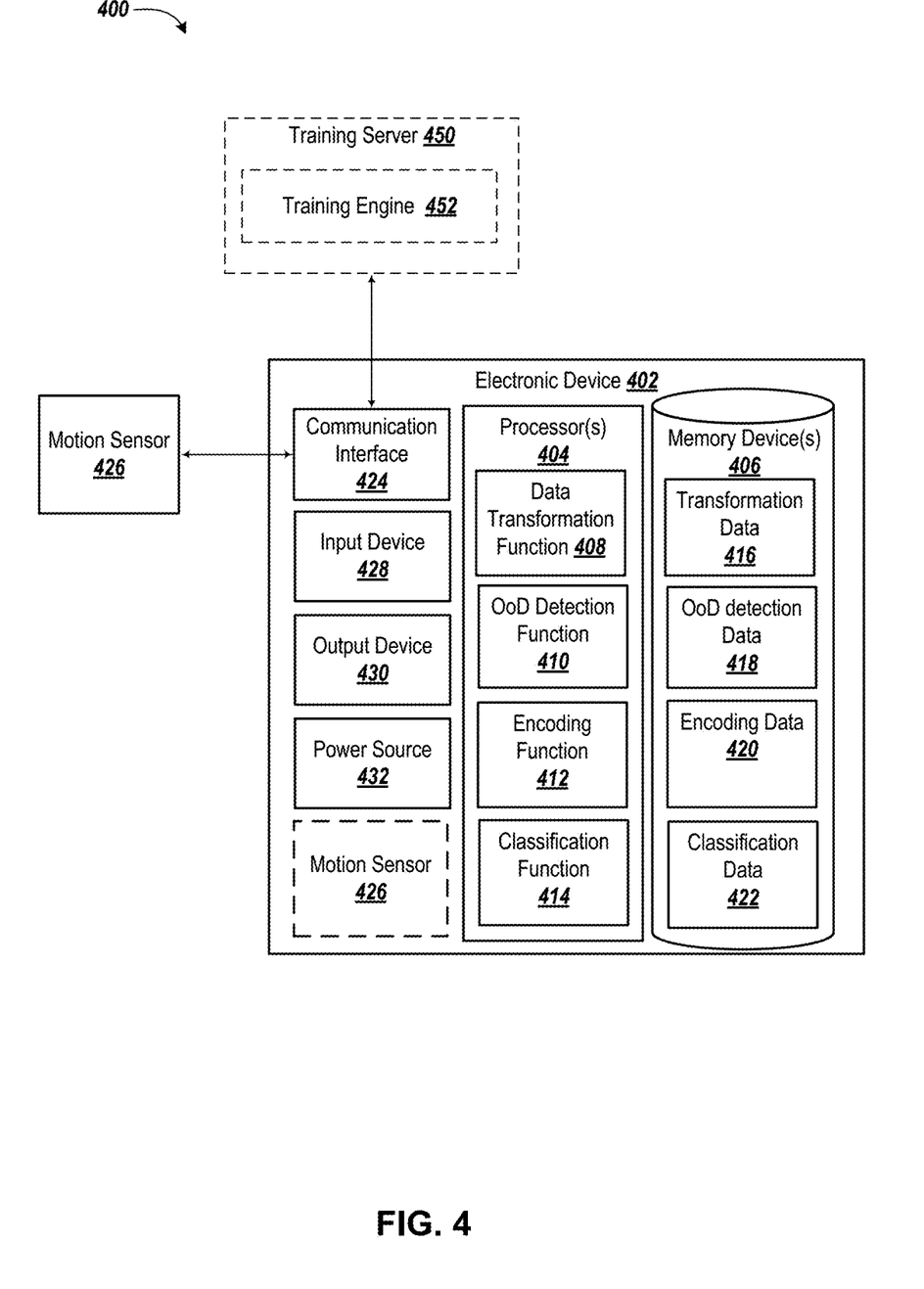
FIG. 4 illustrates a block diagram of an OoD detection and activity classification system, according to some embodiments.

FIG. 4 illustrates a block diagram of an OoD detection and activity classification system 400, according to some embodiments. In one embodiment, the OoD detection and activity classification system 400 includes an electronic device 402 that has one or more processor(s) 404, one or more memory devices 406, a communication interface 424, input device(s) 428, output device(s) 430, power source 432 such as a battery, and a motion sensor 426 configured separately from or integrated with electronic device 402. The electronic device 402 may include fewer components, additional components, different components, and/or a different arrangement of components than those illustrated in FIG. 4.

The processor(s) 404 may include one or more processors, microprocessors, data processors, co-processors, application-specific integrated circuits (ASICs), controllers, programmable logic devices, chipsets, field-programmable gate arrays (FPGAs), application-specific instruction-set processors (ASIPs), system-on-chips (SoCs), central processing units (CPUs) (e.g., one or multiple cores), microcontrollers, and/or some other type of component that interprets and/or executes instructions and/or data. The processor(s) 404 may be implemented as hardware (e.g., a microprocessor, etc.), a combination of hardware and software (e.g., an SoC, an ASIC, etc.), may include one or multiple memories (e.g., cache, etc.), etc.

In some embodiments, the processor(s) 404 controls the overall operation or a portion of the operation(s) performed by the OoD detection and activity recognition system 100 of FIG. 1. The processor 404 performs one or multiple operations based on an operating system and/or various applications or computer programs (e.g., software). The processor(s) 404 accesses instructions from the memory device(s) 406, from other components of the electronic device 402, and/or from a source external to the electronic device 402 (e.g., a network, another device, etc.). The processor(s) 404 may perform an operation and/or a process based on various techniques, including, for example, multithreading, parallel processing, pipelining, interleaving, etc.

The electronic device 402 further includes one or more memory device(s) 406, which may correspond to any combination of volatile and/or non-volatile storage mechanisms. In some embodiments, the memory device(s) 406 include one or multiple memories and/or one or multiple other types of storage mediums. For example, the memory device(s) 406 may include one or multiple types of memories, such as, random access memory (RAM), dynamic random access memory (DRAM), cache, read-only memory (ROM), a programmable read-only memory (PROM), a static random access memory (SRAM), a single in-line memory module (SIMM), a dual in-line memory module (DIMM), a flash memory, and/or some other suitable type of memory. The memory device(s) 406 may include a hard disk, a magnetic disk, an optical disk, a magneto-optic disk, a solid-state drive, a Micro-Electromechanical System (MEMS)-based storage medium, a nanotechnology-based storage medium, and/or some other suitable disk. The memory device(s) 406 may include drives for reading from and writing to the storage medium. The memory device(s) 406 may be external to and/or removable from the electronic device 402, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). The memory devices 406 may store data (e.g., transformation data 416, OoD detection data 418, encoding data 420, classification data 422, etc.), software, and/or instructions associated with processing and carrying out one or more of a data transformation function 408 (e.g., data transformation unit 114 of FIG. 1), an OoD detection function 410 (e.g., OoD detector 116 of FIG. 1), an encoding function 412 (e.g., encoding unit 120 of FIG. 1), and a classification function 414 (e.g., classifier unit 128 of FIG. 1).

The communication interface 424 permits the electronic device 402 to communicate with other devices, systems, sensors, and/or the like on a network. The communication interface 424 may include one or multiple wireless interfaces and/or wired interfaces. For example, the communication interface 424 may include one or multiple transmitters, receivers, or transceivers. The communication interface 424 may operate according to a protocol stack and a communication standard. In some embodiments, the communication interface 424 includes an antenna. The communication interface 424 may include various processing logic or circuitry (e.g., multiplexing/de-multiplexing, filtering, amplifying, converting, error correction, etc.). In some embodiments, the communication interface 424 operates using a long-range wireless protocol, such as a cellular protocol or a Wireless Local Area Network (WLAN) protocol (e.g., the Wi-Fi® protocol), a short-range protocol, such as Personal Area Network (PAN) protocol (e.g., Bluetooth®), or a wired protocol, such as Ethernet.

In some embodiments, the input device 428 permits an input into the electronic device 402. For example, the input device 428 may comprise a keyboard, a mouse, a display, a touchscreen, a touchless screen, a button, a switch, an input port, speech recognition logic, and/or some other type of suitable visual, auditory, or tactile input component. The output device 430 permits an output from the electronic device 402. For example, the output device 430 may include a speaker, a display, a touchscreen, a touchless screen, a projected display, a light, an output port, and/or some other type of suitable visual, auditory, or tactile output component.

In some embodiments, one or more functions of processors (s) may be used to change an operating parameter of the electronic device 402. Any of the OoD detection, data encoding, and/or activity classification may be used to alter an operating parameter. For example, if the electronic device corresponds to a smartphone, the operating parameter may be a mode of the electronic device 402, such as a driving mode, a walking mode, a jogging mode, or some other mode. In one example, if the electronic device 402 is changed to a driving mode based on the activity classification, incoming messages from the communication interface 424 may be suppressed or voiced to the user using a hands-free mode of operation. In a jogging mode, a fitness software application may be launched by the electronic device 402 to track the activity. For a facility automation system, the operating parameters may be a state of a device such as a heating, ventilation, and air conditioning (HVAC) system. In some embodiments, changing the operating parameter includes entering an alert state, where the electronic device 402 sends an alert message to a preconfigured other party indicating a safety issue, such as a fall.

In some embodiments, the motion sensor 426 acquired motion data associated with a state of inertia corresponding to the electronic device 402. For example, the motion sensor 426 may acquire data associated with a translational movement and/or a rotational movement of the electronic device 402.

In some embodiments, one or more of the data transformation function 408, OoD detection function 410, encoding function 412, and/or classification function 414 carry out functionality using the learning techniques described herein. The activity classification system 400 may further include a training server 450 having a training system 452 for training one or more learning models (e.g., OoD model 118, embedding model 122, and/or activity classification model 130 of FIG. 1). The training server may train corresponding models for deployment by the electronic device 402. The training server may receive data from an electronic device and updates the learning model from time to time. However, in other embodiments, the training and execution of the learning model may be performed entirely on the electronic data. In other embodiments, a portion of the training and live execution may be split between training server 450 differently from the previously described divisions of responsibility.

Figure 5:
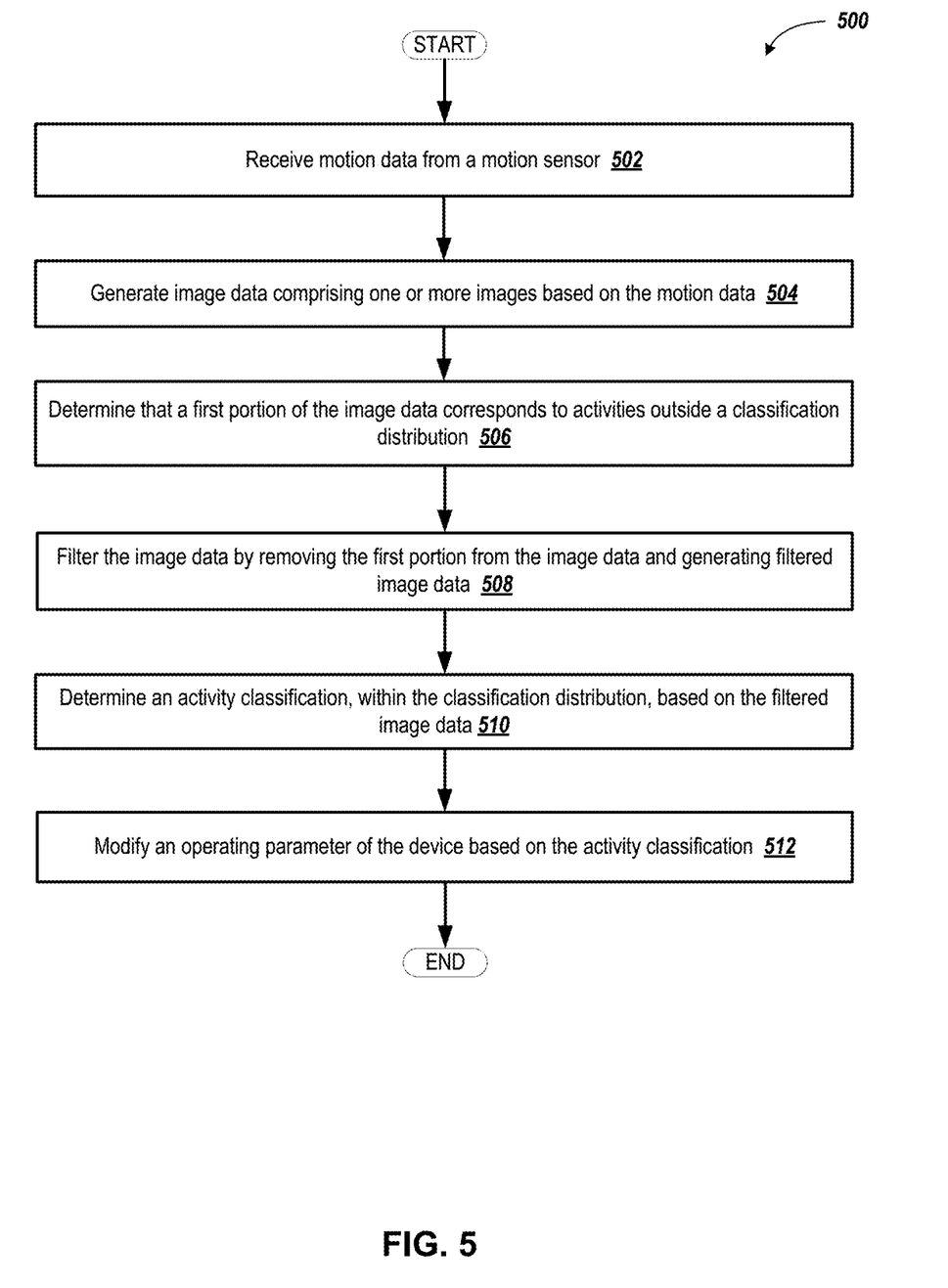
FIG. 5 is a flow chart illustrating an example method for OoD detection and activity classification, according to some embodiments.

FIG. 5 is a flow chart illustrating an example method 500 for OoD detection and activity classification according to some embodiments. Method 500 is performed by processing logic that may comprise hardware (e.g., circuitry, dedicated logic, etc.), software (such as is run on a general-purpose computer system or a dedicated machine), or any combination thereof. In one implementation, the method is performed using one or more of pre-processing unit 212, data transformation unit 214, OoD detector 216, encoding unit 220, and/or classifier unit 288 of FIG. 1, while in some other implementations, one or more blocks of FIG. 5 may be performed by one or more other machines not depicted in the figures.

Method 500 may include receiving motion data, OoD detection of the motion data, encoding of the data, and activity classification of the data. At block 502, motion is received from a motion sensor. In some embodiments, the motion data is received from a motion sensor such as an accelerometer, a gyroscope, a magnetometer, a compass, and/or the like. The motion data may include raw-motion data streams, such as 3-axis accelerometer data and 3-axis gyroscope data.

In some embodiments, the motion data further includes synthetic data, or data engineered from raw sensor data. For example, as described in previous embodiments, various engineering tools can perform feature extraction and/or create artificial and/or virtual parameter combinations. A feature extractor can create various features by performing variable analysis such as process control analysis, univariate limit violation analysis, and/or multivariate limit violation analysis on raw sensor data. In some embodiments, the sensor data is normalized across instances of time, such as, for example, to remove environmental noise. For example, processing logic may filter noise from the raw motion data and sample the motion data into windows of predetermined length. For example, a Butterworth noise filter may be used, and the sampling windows may have lengths of about 1-3 seconds, such as 1.5 seconds.

At block 504, processing logic generates image data comprising one or more images based on the motion data. In some embodiments, the one or more images include one or more pixels. Processing logic may determine a first value of a first color channel associated with the one or more pixels of the motion data corresponding to a first dimension of space. Processing logic may determine a second value of a second color channel associated with the one or more pixels based on a second selection of the motion data corresponding to a second dimension of space.

At block 506, processing logic determines that a first portion of the image data corresponds to activities outside a classification distribution. The image data may be input to a machine learning model (e.g., OoD model 118). During inference, the machine learning model calculates a score for an individual portion of the image data. The scoring function evaluates both in-distribution samples and OoD samples in the form of inertial images. Processing logic determines whether individual images are in-distribution and OoD.

At block 508, processing logic filters the image data by removing the first portion from the image data and generating filtered image data. Processing logic may include filtering logic that provides inertial images that are classified as being in-distribution to downstream processes, while inertial images that are classified as OoD are removed from the broader data sample or otherwise filtered from the data transmitted to downstream processes.

At block 510, processing logic determines an activity classification, within the classification distribution, based on the filtered image data. In some embodiments, processing logic performs linear classification, such as a k-Nearest Neighbor (k-NN) classification. Processes logic may recognize a known activity defined by an activity classification model (e.g., activity classification model 130 of FIG. 1), while rejecting unknown activities using a thresholding technique to reduce false alarms. In some embodiments, the in-distribution classifications may include jumping, standing, sitting, running, ascending stairs, descending stairs, among other activities.

At block 512, processing logic modifies an operating parameter of the device based on the activity classification. For example, if the device corresponds to a smartphone, the operating parameter may be a mode of the device, such as a driving mode, a walking mode, a jogging mode, or some other mode. In one example, if the device is changed to a driving mode based on the activity classification, incoming messages processed by the device may be suppressed or voiced to the user using a hands-free mode of operation. In a jogging mode, the device may launch a fitness software application to track the activity. For a facility automation system, the operating parameters may be a state of a device such as a heating, ventilation, and air conditioning (HVAC) system. In some embodiments, changing the operating parameter includes entering an alert state, where the device sends an alert message to a preconfigured other party indicating a safety issue, such as a fall.

In some embodiments, processing logic uses the image data as input to a first machine learning. Processing logic obtains one or more outputs of the first machine learning model. The one or more outputs of the first machine learning model indicate that the first portion of the image data comprises data outside the classification distribution. Processing logic may further use the filtered image data as input to a second machine learning model. The processing logic further obtains one or more outputs of the second machine learning model. The one or more outputs of the second machine learning model indicate the activity classification.

Figure 6:
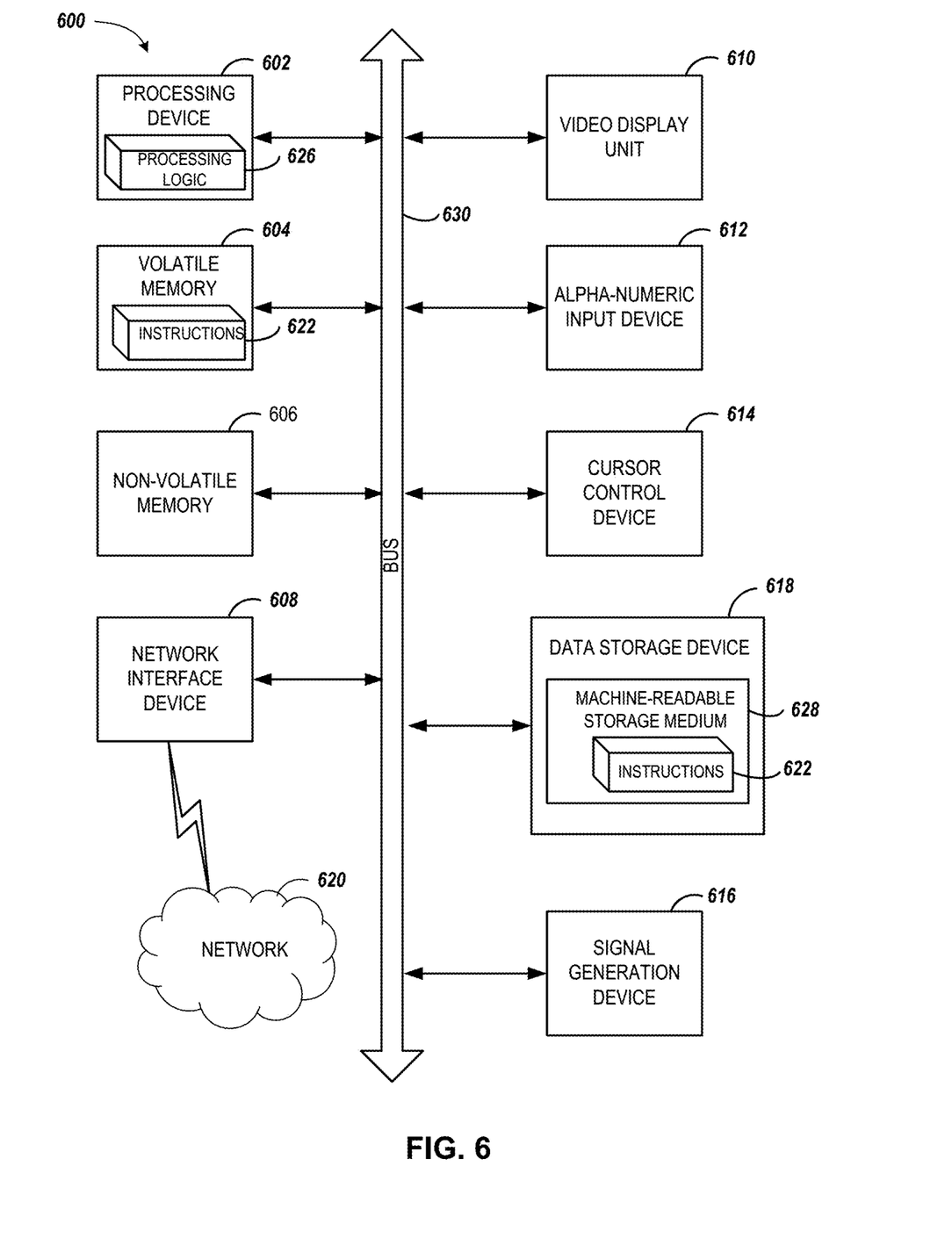
FIG. 6 depicts a block diagram of an example computing device, operating in accordance with one or more aspects of the present disclosure.

FIG. 6 depicts a block diagram of an example computing device 600, operating in accordance with one or more aspects of the present disclosure. In various illustrative examples, various components of the computing device 600 may represent various components of pre-processing unit 212, data transformation unit 214, OoD detector 216, encoding unit 220, and classifier unit 228 of FIG. 1.

Example computing device 600 may be connected to other computer devices in a LAN, an intranet, an extranet, and/or the Internet. Computing device 600 may operate in the capacity of a server in a client-server network environment. Computing device 600 may be a personal computer (PC), a set-top box (STB), a server, a network router, switch or bridge, or any device capable of executing a set of instructions (sequential or otherwise) that specify actions to be taken by that device. Further, while only a single example computing device is illustrated, the term "computer" shall also be taken to include any collection of computers that individually or jointly execute a set (or multiple sets) of instructions to perform any one or more of the methods discussed herein.

Example computing device 600 may include a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 618), which may communicate with each other via a bus 630.

Processing device 602 represents one or more general-purpose processing devices such as a microprocessor, central processing unit, or the like. More particularly, processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application-specific integrated circuit (ASIC), a field-programmable gate array (FPGA), a digital signal processor (DSP), a network processor, or the like. In accordance with one or more aspects of the present disclosure, processing device 802 may be configured to execute instructions implementing method 500 illustrated in FIG. 5.

Example computing device 600 may further comprise a network interface device 608, which may be communicatively coupled to a network 620. Example computing device 600 may further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 616 (e.g., a speaker).

Data storage device 618 may include a machine-readable storage medium (or, more specifically, a non-transitory machine-readable storage medium) 628 on which is stored one or more sets of executable instructions 622. In accordance with one or more aspects of the present disclosure, executable instructions 622 may comprise executable instructions associated with executing methods 500 illustrated in FIG. 5.

Executable instructions 622 may also reside, completely or at least partially, within the main memory 604 and/or within the processing device 602 during execution thereof by the example computing device 600, main memory 604, and processing device 602 also constituting computer-readable storage media. Executable instructions 622 may be transmitted or received over a network via the network interface device 608.

While the computer-readable storage medium 628 is shown in FIG. 6 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general-purpose computer system selectively programmed by a computer program stored in the computer system. Such a computer program may be stored in a computer-readable storage medium, such as, but not limited to, any type of disk, including optical disks, compact disc read-only memory (CD-ROMs), magnetic-optical disks, read-only memories (ROMs), random access memories (RAMs), erasable programmable read-only memory (EPROMs), electrically erasable programmable read-only memory (EEPROMs), magnetic disk storage media, optical storage media, flash memory devices, other types of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware, or code set forth above may be implemented via instructions or code stored on a machine-accessible, machine-readable, computer accessible, or computer-readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example" or "exemplary" is not necessarily to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

The invention claimed is:

1. A method, comprising:
    receiving, by a device from a motion sensor, motion data;
    generating, by the device, image data by transforming the motion data into inertial images representing the motion data, wherein each of the inertial images comprises one or more images based on the motion data;
    determining, by the device, that a first portion of the image data corresponds to activities outside a classification distribution;
    filtering, by the device, the image data by removing the first portion from the image data and generating filtered image data;
    determining, by the device, an activity classification, within the classification distribution, based on the filtered image data; and
    modifying an operating parameter of the device based on the activity classification.

2. The method of claim 1, wherein receiving the motion data comprises receiving at least one of accelerometer data, gyroscope data, or magnetometer data.

3. The method of claim 1, wherein a first image of the one or more images comprises one or more pixels, wherein the method further comprises:
    determining a first value of a first color channel associated with the one or more pixels based on a first selection of the motion data corresponding to a first dimension of space; and
    determining a second value of a second color channel associated with the one or more pixels based on a second selection of the motion data corresponding to a second dimension of space.

4. The method of claim 1, wherein the motion data further indicates a state of inertia corresponding to the device.

5. The method of claim 1, further comprising:
    using the image data as input to a first machine learning model;
    obtaining one or more outputs of the first machine learning model, the one or more outputs of the first machine learning model indicating that the first portion of the image data comprises data outside the classification distribution;
    using the filtered image data as input to a second machine learning model; and obtaining one or more outputs of the second machine learning model, the one or more outputs of the second machine learning model indicating the activity classification.

6. The method of claim 1, further comprising:
    generating, by the device, an embedding vector using an embedding model that generates a mean component of the filtered image data and a variance component of the filtered image data, wherein the activity classification is determined further using the embedding vector.

7. The method of claim 1, further comprising:
    training an embedding model, at least in part, using a quadruplet loss technique with only training data that corresponds to the classification distribution; and
    generating an embedding vector using the embedding model, wherein the activity classification is determined further using the embedding vector.

8. The method of claim 1, wherein the activity classification is determined further using k-Nearest Neighbor classification logic.

9. A device, comprising:
    a motion sensor configured to generate motion data; and
    a processor configured to:
        receive the motion data from the motion sensor;
        generate image data by transforming the motion data into inertial images representing the motion data, wherein each of the inertial images comprises one or more images based on the motion data;
        determine that a first portion of the image data corresponds to activities outside a classification distribution;
        filter the image data by removing the first portion from the image data and generating filtered image data;
        determine an activity classification, within the classification distribution, based on the filtered image data; and
        modify an operating parameter of the device based on the activity classification.

10. The device of claim 9, wherein the motion data comprises at least one or more of accelerometer data, gyroscope data, or magnetometer data.

11. The device of claim 9, wherein a first image of the one or more images comprises one or more pixels, wherein the processor is further configured to:
    determine a first value of a first color channel associated with the one or more pixels based on a first selection of the motion data corresponding to a first dimension of space; and
    determine a second value of a second color channel associated with the one or more pixels based on a second selection of the motion data corresponding to a second dimension of space.

12. The device of claim 9, wherein the motion data further indicates a state of inertia corresponding to the device.

13. The device of claim 9, wherein the processor is further configured to:
    generate an embedding vector using an embedding model that generates a mean component of the filtered image data and a variance component of the filtered image data, wherein the activity classification is determined further using the embedding vector.

14. The device of claim 9, wherein the processor is further configured to:
   train an embedding model, at least in part, using a quadruplet loss technique with only training data that corresponds to the classification distribution; and
   generate an embedding vector using the embedding model, wherein the activity classification is determined further using the embedding vector.

15. The device of claim 9, wherein the processor is further configured to determine the activity classification using k-nearest neighbor logic.

16. A non-transitory machine-readable storage medium comprising instructions that, when executed by a processing device, cause the processing device to perform operations comprising:
   receiving motion data from a motion sensor;
   generating image data by transforming the motion data into inertial images representing the motion data, wherein each of the inertial images comprises one or more images based on the motion data;
   determining that a first portion of the image data corresponds to activities outside a classification distribution;
   filtering the image data by removing the first portion from the image data and generating filtered image data;
   determining an activity classification, within the classification distribution, based on the filtered image data; and
   modifying an operating parameter of the processing device based on the activity classification.

17. The non-transitory machine-readable storage medium of claim 16, wherein a first image of the one or more images comprises one or more pixels, wherein the operations further comprise:
   determining a first value of a first color channel associated with the one or more pixels based on a first selection of the motion data corresponding to a first dimension of space; and
   determining a second value of a second color channel associated with the one or more pixels based on a second selection of the motion data corresponding to a second dimension of space.

18. The non-transitory machine-readable storage medium of claim 16, wherein the operations further comprise:
   generating an embedding vector using an embedding model that generates a mean component of the filtered image data and a variance component of the filtered image data, wherein the activity classification is determined further using the embedding vector.

19. The non-transitory machine-readable storage medium of claim 16, wherein the operations further comprise:
   training an embedding model, at least in part, using a quadruplet loss technique with only training data that corresponds to the classification distribution; and
   generating an embedding vector using the embedding model, wherein the activity classification is determined further using the embedding vector.

20. The non-transitory machine-readable storage medium of claim 16, wherein the activity classification is determined using k-Nearest Neighbor classification logic.

* * * * *